June 28, 1955    L. N. GRAZIOSE    2,712,109
CAR-DRIVEN EMERGENCY GENERATORS
Filed Aug. 4, 1951

INVENTOR.
Louis N. Graziose
BY

United States Patent Office 2,712,109
Patented June 28, 1955

2,712,109

CAR-DRIVEN EMERGENCY GENERATORS

Louis N. Graziose, Roslyn, N. Y.

Application August 4, 1951, Serial No. 240,367

2 Claims. (Cl. 322—42)

This invention relates to car-driven emergency generators.

One object of this invention is a car-driven emergency generator which may be used to supply electric power in the case of power failure and which has a very simple construction with little chance for mechanical failure.

A further object of this invention is a car-driven generator which may be used to supply electricity in the field and at places where electric power is not readily available.

Figure 2:
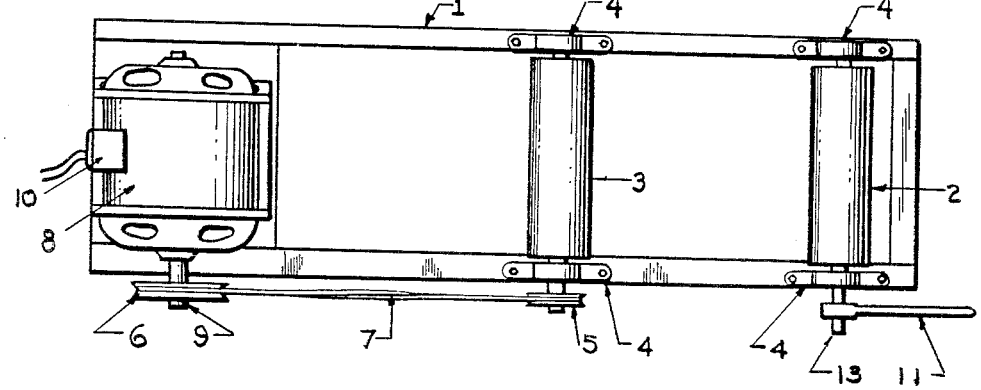
Figure 1:
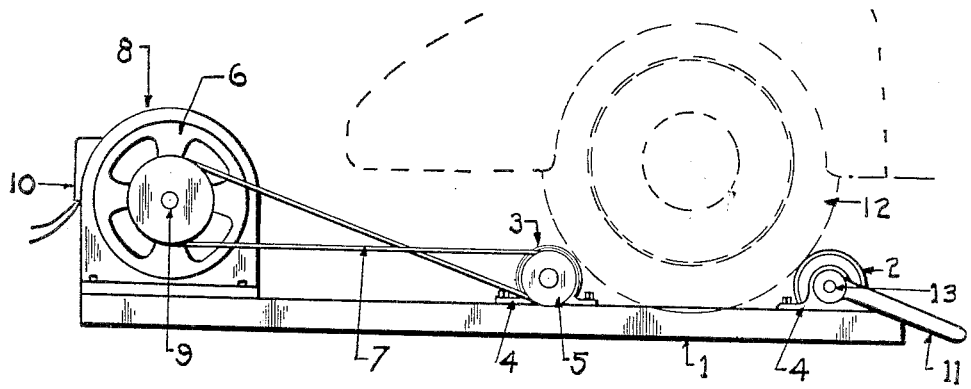

These and still further objects will become apparent from the following description read in conjunction with the drawings in which:

Fig. 1 shows a side elevation of an embodiment of a car-driven electric generator in accordance with the invention, and Fig. 2 shows a top elevation of the car-driven generator shown in Fig. 1.

According to the invention, two rollers are freely mounted for rotation on a frame. The axes of rotation of the rollers are parallel and the rollers are so spaced apart that the rear wheel of a motor vehicle may be cradled between them. One of the rollers has brake means to prevent rotation thereof when so desired. These brake means may comprise any conventionally known brake means such as a brake drum with a tightening band, a gear with a movable lug which will hold the gear rigidly in position, or any other known means for preventing rotation of a shaft. According to the preferred construction of the invention, however, the brake means are very simply and economically constructed with practically no chance of failure by having an extension of the roller shaft either keyed or formed of a non-circular cross section and having a wrench which fits over this shaft extension and rigidly holds the shaft. The wrench element should have a handle long enough so that it will make contact with the ground when the frame of the unit is in any normal operating position. The other roller should be freely rotatable at all times and have power transmitting means positioned on an extention of one of its rotating shafts. The transmitting means are connected to a generator of any known construction so that the generator is caused to rotate when the last mentioned roller rotates. The power transmitting means may, for example, consist of a sprocket wheel on the roller, a sprocket wheel on the generator and an endless chain connected between them. The transmission means may also consist of pulleys on both the generator and the roller shaft with a drive belt connected therebetween.

The new generator system according to the invention will be more readily understood by referring to one embodiment as shown in the accompanying drawings.

The box-like frame support 1 has the rollers 2 and 3 and the generator 8 mounted thereon. The rollers 2 and 3 are mounted on ball bearing pillow blocks 4 positioned at each end of each roller shaft and attached to the frame 1 by means of bolts. The rollers 2 and 3 are mounted with their axes of rotation parallel and spaced apart so that the rear wheel of a motor vehicle may be cradled therebetween as shown in Fig. 1 by the dotted line with the rear wheel being designated by the reference numeral 12. The roller 2 has a removable wrench 11 attached to the end of its shaft 13 which rotates with the roller 2. The end of the shaft 13 is formed as a nut so that the wrench 11 will slip over it but will not allow it to rotate within the wrench. Instead of the shaft 13 being formed as a nut, it may be formed in any non-circular shape with the end of the wrench 11 correspondingly formed. The end of the shaft 13 may also be keyed with the end of the wrench 11 correspondingly keyed. If, however, the shaft 13 is formed at its end as a nut, any standard wrench may be used as the wrench 11 which fits over the end 13.

The roller 3 has the pulley 5 which is rigidly attached to one end of its shaft and rotates with the roller 3. The generator 8 has the pulley 6 rigidly attached to the end of its drive shaft 9. The drive belt 7 is connected between the pulleys 5 and 6 so that any rotation of the roller 3 will cause the drive shaft 9 of the generator 8 to rotate and thus cause the generator to function. The generator 8 has the power lead 10 from which the source of desired power may be tapped. Instead of the pulleys 5 and 6 and the drive belt 7, sprocket wheels and a sprocket chain may be correspondingly substituted. It is also possible to use any known transmission means for transmitting the rotation of the roller 3 to the generator 8.

In operation the wrench 11 is placed over the shaft 13 of the roller 2. The rear wheel of a motor vehicle is backed up against the roller 2 which will cause a limited rotation of this roller until the end of the wrench 11 strikes the ground in a position just opposite to that shown in Fig. 1. The rear wheel may be then further backed over the rigidly held roller 2 until it is cradled between the rollers 2 and 3. The wrench 11 is then removed so that both rollers 2 and 3 are free to rotate. The rear wheel 12 of the motor vehicle is then caused to rotate which in turn will cause both the rollers 2 and 3 to rotate with it. As the roller 3 revolves, it causes the pulley 5 to revolve which through the drive belt 7 causes the pulley 6 to revolve which turns the drive shaft 9 of the generator 8. The leads 10 are connected to the desired electric load, as for example, a lighting circuit of a house or any other electric unit deemed necessary, through a suitable switch. The proper speed of the generator depending upon the load is obtained by adjusting the throttle of the engine connected to the wheel 12. Thus, if an automobile is used as the power means, the throttle of the automobile is adjusted until the proper speed of the generator 8 is reached. When use of the generator is concluded, the wrench 11 is again placed over the shaft 13. The vehicle is then driven forward. When the wrench 11 strikes the ground in the position shown in Fig. 1, the roller 2 can no longer rotate and the vehicle is driven over this roller and off the device.

Generator 8 may be any known generator such as, for example, a 110 volt A. C. generator which may be used for emergency use in a standard house circuit.

The new generator may be used in case of a utility electric power failure to supply power for essential electrical devices such as heating units, light bulbs, or any other device deemed necessary.

The generator may also be used to supply electricity to field and mobile units or in any other place where electric power is not readily obtainable.

The construction according to the invention is very simple with little chance for mechanical failure. The starting and use of the invention is of such simple nature that there is great advantage and ease of operation over other known emergency generator units. Besides the operating advantages, the cost of fabrication of the generator according to the invention is less than any other known emergency generator of the same electrical capacity. The embodiment as set forth in the drawing is given to illustrate the invention and not limit the same. Many embodiments and modifications will become apparent to the skilled artisan upon reading the above and it is, therefore, only intended that the invention should be limited by the appended claims or their equivalent.

I claim:

1. An electrical generator unit for use in combination with a drive wheel of a motor vehicle, comprising a frame support having a first and second roller parallelly mounted thereon for free rotation and spaced apart to cradle the drive wheel of a motor vehicle therebetween, a wrench removably positioned in rotationally secure holding engagement with one end of the shaft of said first roller, said wrench having a length substantially greater than the height of said shaft above the bottom of said frame support, so that said wrench will, upon attempted rotation of said first roller, contact the ground and secure said first roller against rotation, an electrical generator mounted on said frame for rotation with said second roller, and transmission means positioned for transmitting rotation from said second roller to said generator.

2. Generator unit according to claim 1 in which said generator is mounted on said frame with the axis of rotation of its drive shaft substantially parallel to the axis of rotation of said roller, and said transmission means comprising a pulley rigidly positioned on the shaft of said second roller, a pulley rigidly positioned on the drive shaft of said generator and a flexible drive belt connected therebetween.

References Cited in the file of this patent

UNITED STATES PATENTS

| | | |
|---|---|---|
| 985,338 | Gans | Feb. 28, 1911 |
| 1,184,159 | Becker | May 23, 1916 |
| 1,205,288 | Thomas | Nov. 21, 1916 |
| 2,223,899 | Pietras | Dec. 3, 1930 |
| 2,496,787 | Fox | Feb. 7, 1950 |

FOREIGN PATENTS

| | | |
|---|---|---|
| 99,382 | Switzerland | June 1, 1923 |